(12) United States Patent
Jeong

(10) Patent No.: US 7,523,979 B2
(45) Date of Patent: Apr. 28, 2009

(54) CABLE CONNECTING STRUCTURE OF VEHICLE FRONT BODY

(75) Inventor: Yu-Seorg Jeong, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/648,049

(22) Filed: Dec. 28, 2006

(65) Prior Publication Data

US 2008/0122256 A1 May 29, 2008

(30) Foreign Application Priority Data

Sep. 5, 2006 (KR) .................. 10-2006-0085068

(51) Int. Cl.
*B60J 7/00* (2006.01)
(52) U.S. Cl. .............. 296/187.09; 296/187.1; 180/271
(58) Field of Classification Search ......... 296/187.09, 296/187.1; 180/271, 274
See application file for complete search history.

(56) References Cited

U.S. PATENT DOCUMENTS

| | | | | |
|---|---|---|---|---|
| 4,836,321 A | * | 6/1989 | Baumann | 180/232 |
| 5,174,409 A | * | 12/1992 | Osawa | 180/274 |
| 5,472,063 A | * | 12/1995 | Watanabe et al. | 180/274 |
| 6,276,484 B1 | * | 8/2001 | Evans et al. | 180/291 |
| 6,676,709 B1 | | 1/2004 | de la Asuncion et al. | |
| 6,851,505 B2 | * | 2/2005 | Motozawa et al. | 180/274 |
| 7,165,787 B1 | * | 1/2007 | Go | 280/777 |
| 2007/0114745 A1 | * | 5/2007 | Neag et al. | 280/124.1 |

FOREIGN PATENT DOCUMENTS

| | | |
|---|---|---|
| JP | 08-142910 | 6/1996 |
| JP | 10-203411 | 8/1998 |
| JP | 11-091631 | 4/1999 |
| KR | 1020020047706 | 6/2002 |

* cited by examiner

*Primary Examiner*—Joseph D Pape
(74) *Attorney, Agent, or Firm*—Peter F. Corless; Edwards Angell Palmer & Dodge LLP

(57) ABSTRACT

A cable connecting structure of a vehicle front body comprises: a left side member disposed in a longitudinal direction of a vehicle; a right side member disposed in parallel with the left side member; a sub-frame disposed between the left and right side members; and a cable connected to the left and right side members for transmitting impact energy caused by a front offset collision between the left and right side members.

4 Claims, 4 Drawing Sheets

CABLE CONNECTING STRUCTURE OF VEHICLE FRONT BODY

CROSS-REFERENCE TO RELATED APPLICATIONS

The present application claims priority from Korean Patent Application Serial No. 10-2006-0085068 filed with the Korean Intellectual Property Office on Sep. 5, 2006, the disclosure of which is hereby incorporated by reference herein in its entirety.

FIELD OF THE INVENTION

The present invention relates to a front body of a vehicle. More particularly, the present invention relates to a cable connecting structure of a vehicle front body, which is adapted to connect the left and right side members via a cable, thus allowing the vehicle front body to effectively deform during a front offset collision and minimize injury to a passenger thereby.

BACKGROUND OF THE INVENTION

Generally, a vehicle front body, as illustrated in FIG. 1, includes a rectangle-shaped sub-frame 1 connected at four front and rear portions thereof to a left side member 2 and a right side member 3. The side members are installed in the longitudinal direction of the vehicle so as to support various heavy components and front suspensions loaded in the engine compartment.

However, the conventional vehicle front body with such a configuration has a drawback that when an impact load acts on either the left or the right side member during an offset frontal crash, only one of the side members and the sub-frame can deform to absorb collision energy associated with the crash.

There is thus a need for an improved structure that allows both of the side members as well as the sub-frame to effectively deform to absorb collision energy.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

In one aspect, the present invention provides a cable connecting structure of a vehicle front body, comprising: a left side member disposed in a longitudinal direction of a vehicle; a right side member disposed in parallel with the left side member; a sub-frame disposed between the left and right side members; and a cable connected to the left and right side members for transmitting impact energy caused by a front offset collision between the left and right side members.

Preferably, the sub-frame defines therein at least one gusset. Both ends of the cable may be inserted into the left side member and the right side member through the gusset(s).

Suitably, one end of the cable is fixedly attached to the left side member. The other end of the cable is preferably extended adjacently to a transmission and then to the right side member.

The end of the cable that extends adjacently to the transmission is adapted for being able to thrust backward in accordance with by displacement of the transmission during a front offset collision.

The right side member comprises a hook fixedly attached to a front end thereof. The end of the cable that extends adjacently to the transmission is extended to be connected to the hook.

In another aspect, the present invention provides a method of absorbing impact energy during a front offset collision for a vehicle including a left side member, a right side member, and a sub-frame between the side members in a front end portion of the vehicle, comprising the steps of: providing a cable connected to the side members and configured to be able to thrust backward in accordance with backward movement of transmission of the vehicle during a front offset collision; absorbing impact energy by means of one of the side members and the sub-frame; and transmitting the absorbed impact energy to the other side member by means of said cable.

In a further aspect, motor vehicles are provided that comprise a described structure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like. The present structures will be particularly useful with a wide variety of motor vehicles.

Other aspects of the invention are discussed infra.

BRIEF DESCRIPTION OF THE DRAWINGS

For a better understanding of the nature and objects of the present invention, reference should be made to the following detailed description with the accompanying drawings, in which.

DETAILED DESCRIPTION

Figure 1:
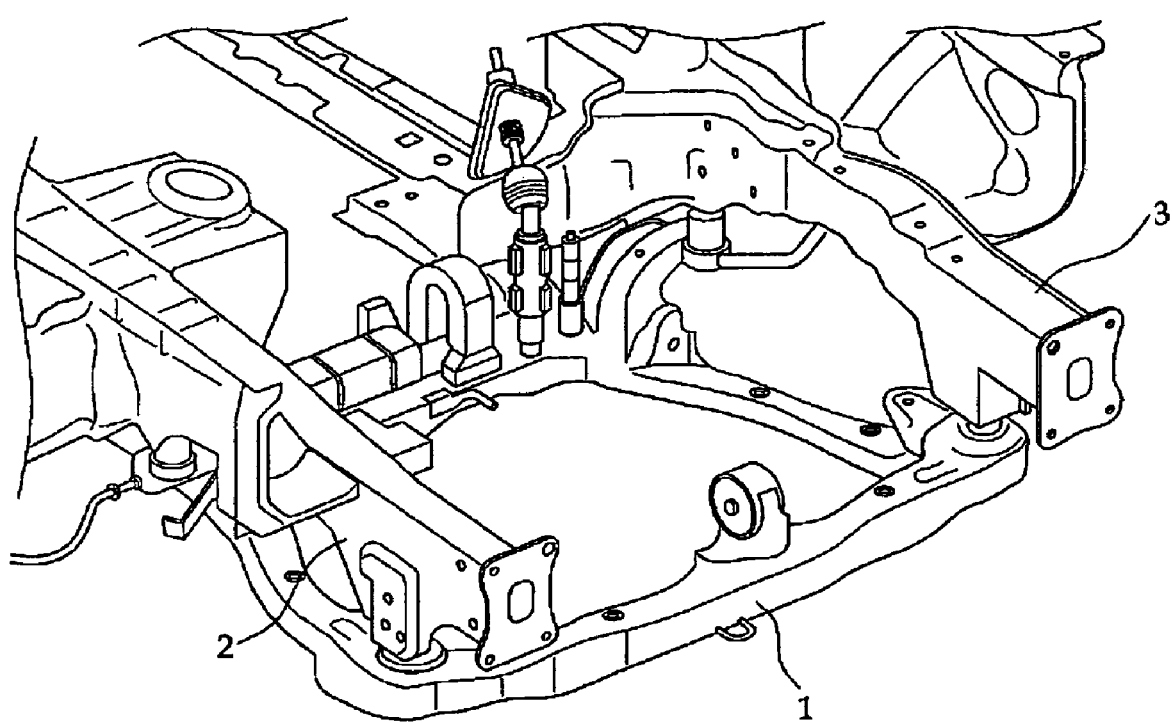
FIG. 1 is a schematic view depicting a conventional vehicle front body.

As discussed above, in one aspect, the present invention provides a cable connecting structure of a vehicle front body comprises: a left side member disposed in a longitudinal direction of a vehicle; a right side member disposed in parallel with the left side member; a sub-frame disposed between the left and right side members; and a cable connected to the left and right side members for transmitting impact energy caused by a front offset collision between the left and right side members.

Reference will now be made in detail to the preferred embodiment of the present invention, wherein like reference numerals refer to like elements throughout. The embodiments are described below so as to explain the present invention by referring to the figures.

Figure 2:
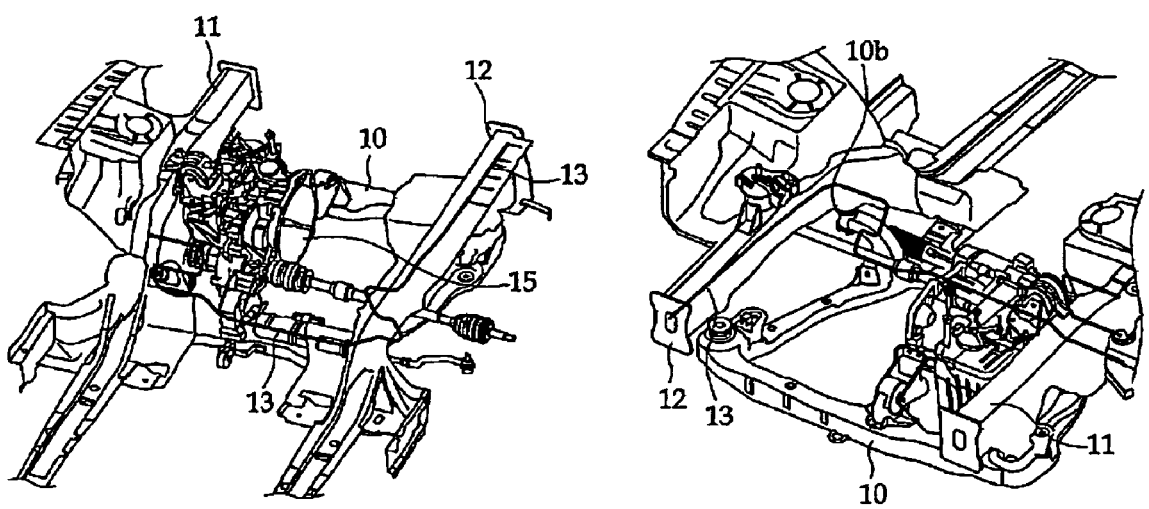
FIG. 2 is a schematic view of a vehicle front body depicting a state where a left side member, right side member, and sub-frame are connected via a cable according to a preferred embodiment of the present invention.

Referring to FIG. 2, a sub-frame 10, which generally has a rectangular shape, is integrally connected at four front and rear portions thereof with a left side member 11 and a right side member 12. Left side member 11 and right side member 11 are placed in the longitudinal direction of the vehicle.

Left side member 11 and right side member 12 are connected to each other via a cable 13 for a mutual transmission of energy. Cable 13 is, therefore, designed to have high rigidity for transmitting the impact energy applied to one of the side members during a front offset collision to the other side member.

Figure 3:
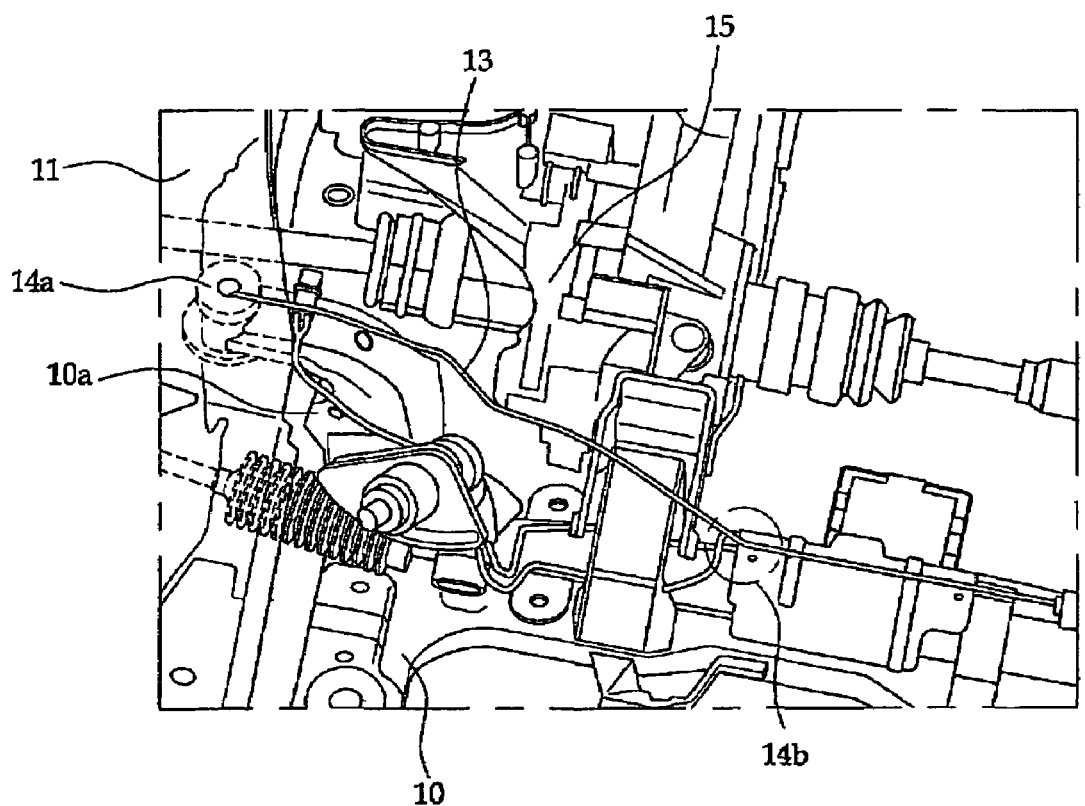
FIGS. 3 and 4 are detailed views depicting the principal parts of FIG. 2.

One end of cable 13 is fixedly attached to left side member 11. In particular, as illustrated in detail in FIG. 3, cable 13 is connected to a sub-frame gusset 10a and left side member joint 14a that connects a rear portion of sub-frame 10 to left side member 11.

The other end of cable 13 extends in the width direction of the vehicle adjacently to a transmission 15. It is designed to be able to thrust backward by the backward movement of the transmission 15 in a vehicle frontal collision.

Cable 13 adjacent to transmission 15 is supported via a coupling bolt by a predetermined portion 14b of sub-frame 10 and is continuously extended widthwise to right side member 12.

The end of cable 13 extended to right side member 12 is configured to penetrate a sub-frame gusset 10b, which connects right side member 12 and sub-frame 10, then to be inserted into right side member 12.

Figure 4:
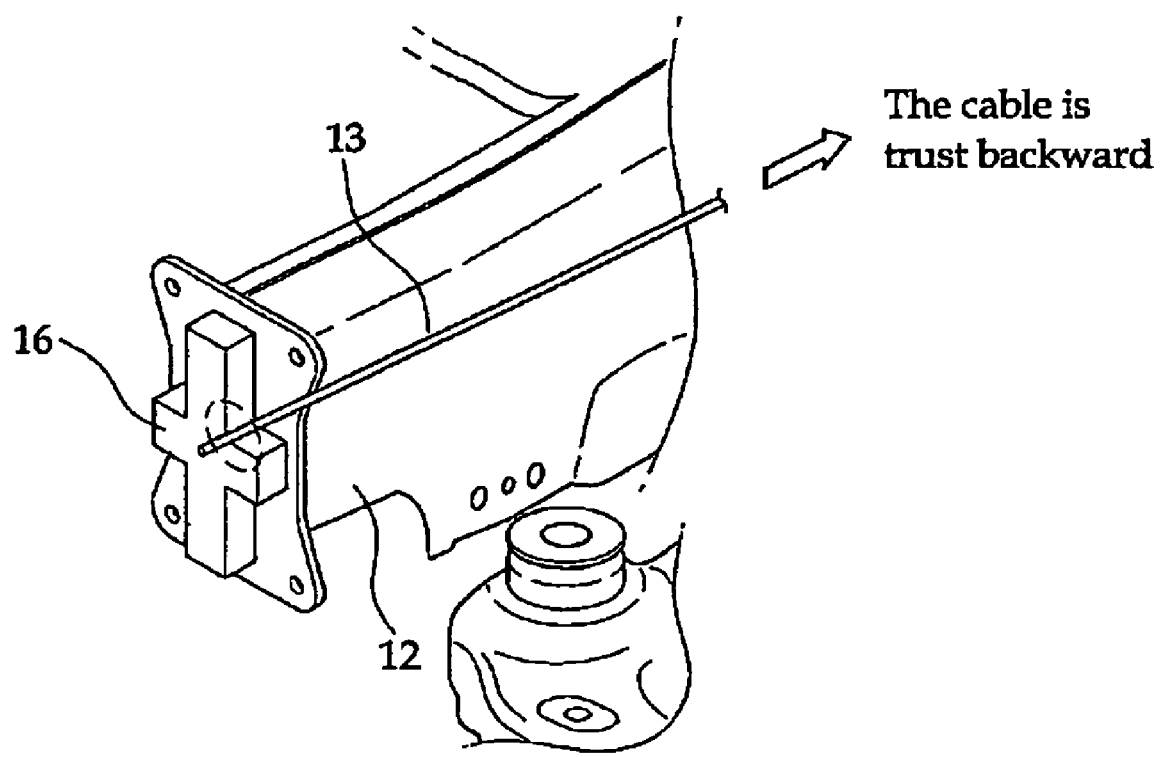

Next, referring to FIG. 4, cable 13 extends to the front end of right side member 12 and is fixed to a hook 16.

Hook 16 secured on the front end of right side member 12 is shown to be formed in a cross shape in FIG. 4. However, the shape of hook 16 is not limited to that shape. Rather, hook 16 can have any shape as long as the other end of cable 13 can be fixed to right side member 12.

Preferably, cable 13 is located inward of left and right side members 11 and 12 and penetrates the gussets to pass through sub-frame 10.

In another aspect, as discussed above, the present invention provides a method of absorbing impact energy during a front offset collision for a vehicle including a left side member, a right side member, and a sub-frame between the side members in a front end portion of the vehicle, comprising the steps of: providing a cable connected to the side members and configured to be able to thrust backward in accordance with backward movement of transmission of the vehicle during a front offset collision; absorbing impact energy by means of one of the side members and the sub-frame; and transmitting the absorbed impact energy to the other side member by means of said cable.

More particularly, as left side member 11 and right side member 12 are interconnected via cable 13 passing through sub-frame 10 in a vehicle transverse direction, for instance, when a left front side collision occurs, left side member 11 and sub-frame 10 primarily receive the collision impact and deform for absorbing impact energy. Transmission 15 thrusts toward the passenger compartment upon the front impact, and cable 13 close to transmission 15 is pulled rearward in accordance with the displacement of transmission 15 and thereby transmits the impact energy to right side member 12.

Once the impact energy is supplied to right side member 12 via cable 13, right side member 12 deforms in shape corresponding to that of left side member 11, thus effectively absorbing and mitigating the impact energy.

Furthermore, as hook 16 is in large contact with right side member 12, right side member 12 can sufficiently receive the collision energy via cable 13, resulting in an efficient deformation of right side member 12.

As apparent from the foregoing, the present invention provides an advantage: when a front offset collision takes place, impact energy applied to one side member can be effectively transmitted to the other side member via a cable, thereby simultaneously and effectively deforming both of the side members and the sub-frame to absorb the impact energy and maximizing passenger safety as well.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A cable connecting structure of a vehicle front body, comprising:
    a left side member disposed in a longitudinal direction of a vehicle;
    a right side member disposed in parallel with the left side member;
    a sub-frame disposed between the left and right side members; and
    a cable connected to the left and right side members for transmitting impact energy caused by a front offset collision between the left and right side members
    wherein one end of said cable is fixedly attached to said left side member, and the other end of said cable is extended adjacently to a transmission and then to said right side member, and the end of said cable extending adjacently to the transmission is adapted for being able to thrust backward in accordance with by displacement of the transmission during a front offset collision.

2. The structure as defined in claim 1, wherein the sub-frame defines therein at least one gusset.

3. The structure as defined in claim 2, wherein both ends of said cable are inserted into said left and right side members through said gussets.

4. The structure as defined in claim 1, wherein said right side member comprise a hook fixedly attached to a front end thereof and the end of said cable extending adjacently to the transmission is extended to be connected to said hook.

* * * * *